June 12, 1951     J. M. SHRYOCK     2,556,780
MIXING VALVE
Filed Jan. 10, 1948
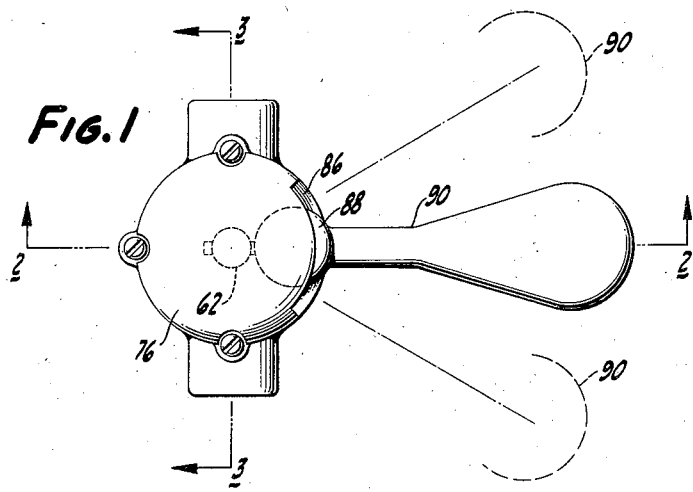
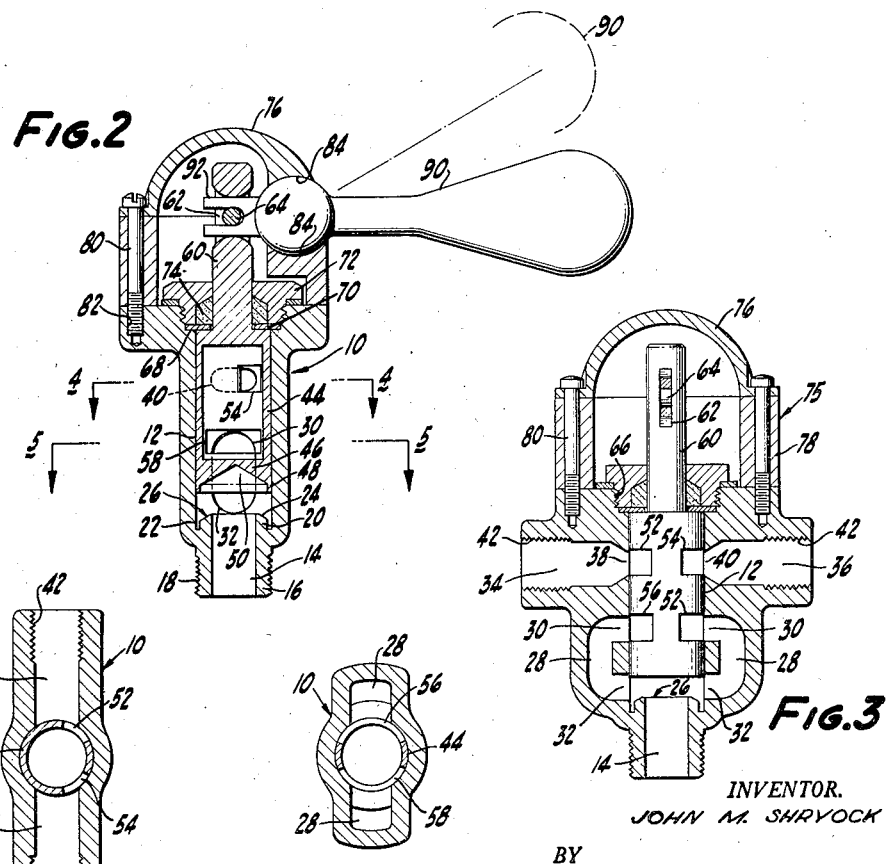
INVENTOR.
JOHN M. SHRYOCK
BY Taylor and Lassagne
ATTORNEYS Patented June 12, 1951

2,556,780

UNITED STATES PATENT OFFICE 2,556,780

MIXING VALVE

John M. Shryock, Delhi, Calif.

Application January 10, 1948, Serial No. 1,550

1 Claim. (Cl. 277—18)

This invention relates to mixing valves, and more particularly to a mixing valve of the type having hot and cold fluid feed lines and adapted to provide an outlet stream which may be varied as to volume and temperature.

An object of the present invention is to provide a valve having a high efficiency in the mixing of hot and cold fluid feed streams. Another object of the invention is to provide a mixing valve whereby any desired proportion of hot and cold fluid inlet streams is mixed together, divided, and mixed together again before issuing from the valve.

A further object of the invention is to provide a novel and simplified mixing valve structure which may be readily disassembled for the inspection of parts.

Broadly, the valve of the invention comprises a valve body having an axial bore and hot and cold fluid inlet passages communicating with the bore adjacent one end thereof. Oppositely disposed bypass passageways having their inlets communicating with the bore and their outlets also communicating with the bore adjacent the discharge end thereof are provided in the valve body. An annular valve seat defining the discharge opening for the bore extends into the lower end of the bore, and engageable with the seat is a hollow cylinder which is slidable and rotatable in the bore. Spaced pairs of inlet and outlet apertures are provided in the cylinder and so arranged that when the lower end of the cylinder is in sealing engagement with the seat, the inlet passages and the inlet and outlet openings of the by-pass passageways are cut off by the wall of the cylinder. Upon movement of the cylinder out of engagement with the seat, the inlet apertures of the cylinder are brought into any desired degree of registration with one or both of the inlet passages, depending upon the rotational orientation of the cylinder, thus allowing fluid to pass into the cylinder; the outlet apertures of the cylinder are brought into registration with the inlet openings of the bypass passageways, thus allowing the fluid in the cylinder to pass therefrom and into each of the bypass passageways; and the outlet openings of said passageways are disclosed beneath the cylinder to allow the fluid from the passageways to become remixed in the bore and issue from the valve.

Other objects and advantages of the invention will be apparent from the following description taken in conjunction with the drawing forming part of this specification, and in which:

Fig. 1 is a top plan view of the mixing valve embodied in the invention;

Fig. 2 is a view in section of the valve taken along lines 2—2 of Fig. 1;

Fig. 3 is a view in section of the valve taken along lines 3—3 of Fig. 1;

Fig. 4 is a view in section taken along lines 4—4 of Fig. 2; and

Fig. 5 is a view in section taken along lines 5—5 of Fig. 2.

Referring to the drawing for more specific details of the invention, 10 is a valve body having an axial bore or passage 12 in communication with a bore or passage 14 of an outlet nozzle 16 formed integral with the body 10. The outlet nozzle 16 is provided with external threads 18 for the attachment thereto of any appropriate nozzle fitting, and said nozzle 16 is further provided with a portion 20 extending inwardly of the passage 12 and spaced from the wall of said passage to define an annular recess 22. The portion 20 of the nozzle is provided with an angularly inclined upper edge 24 forming a valve seat indicated generally at 26.

The valve body 10 has oppositely disposed and substantially U-shaped bypass passageways 28 with inlet openings 30 communicating with the bore 12 and outlet openings 32 also communicating with the bore 12 immediately above the valve seat 26. The valve body 10 is further provided with oppositely disposed inlet passages 34 and 36 having openings 38 and 40 in communication with the bore 12, and having internal threads 42 for the attachment of water lines, not shown. Passages 34 and 36 are adapted, respectively, for the introduction of hot and cold water into the valve body.

Fitted within the bore 12 so as to be vertically movable and rotatable therein is a valve element 44 in the form of a hollow cylinder having a solid lower end 46 counterbored to provide a skirt 48, receivable with the annular recess 22, and a conical recess 50 complementary to the upper edge 24 of the valve seat 26. The cylindrical valve element 44 is provided with a pair of radially spaced inlet apertures 52 and 54 and a pair of radially spaced outlet apertures 56 and 58 of greater arcuate length than the inlet apertures. The valve element 44 has integral therewith a stem 60 having an axial slot 62. A pin 64 is carried by the stem transversely of the slot 62.

The valve body 10 is provided with an internally threaded axial counterbore 66 defining with the upper end of the bore 12 a shoulder 68 serving as the seat for a washer 70. The washer is maintained in place by an externally threaded cap plug 72 in engagement with the threads of the counterbore 66. Suitable packing 74 disposed above the washer 70 and within the cap plug 72 surrounds the stem 60.

A bonnet, indicated generally at 75, and comprising a cap member 76 and a ring member 78 is secured to the valve body 10, as by threaded bolts 80 engageable in tapped holes 82 of the body 10, to serve in part as a protective housing for the stem 60. The cap and ring members of the bonnet are each provided with arcuate slots having concave inner surfaces 84, said slots together forming an arcuate slot 86 for the reception of a ball-shaped fulcrum 88 of a handle 90 having a bifurcated inner end 92 extending within the slot 62 between the stem 60 and the pin 64.

A pivoting of the handle 90 laterally so as to move the ball-shaped fulcrum 88 in the slot 86 is effective to rotate the valve element 44, while a movement of the handle 90 downwardly from the dotted line position of Fig. 2 to the solid line position is effective to raise the valve element from a lowermost position, where the skirt 48 and conic recess 50 are respectively within the annular recess 22 and in sealing engagement with the valve seat 26, to an uppermost position wherein the valve is fully opened for use and wherein the valve element 44 is in abutting relation with the washer 70 which serves as a stop member for said valve element.

When the valve element is in the lowermost or closed valve position, the inlet apertures 52 and 54 are located between the openings 38 and 40 and the inlet openings 30 of the bypass passageways 28, thus preventing influx of water from the passages 34 and 36 into the valve element 44, while the outlet apertures 56 and 58 are located between the inlet openings 30 and the outlet openings 32 of the passageways 28, thus sealing off said passageways from the interior of the valve element 44.

When the valve element is moved upwardly to an open position it is possible to obtain any desired mixture of hot and cold water at the outlet of nozzle 16, and any desired volume of such mixture, by controlling the distance through which the element 44 is raised and by pivoting the element 44. A partial raising of the element 44 causes a partial registration of the inlets 52 and 54 with the openings 38 and 40 and a partial registration of the outlets 56 and 58 with the inlet openings 30 of the passageways 28, thus allowing for only a partial flow of water through the valve. In any position of vertical adjustment, the element 44 may be rotated to bring the inlet 52 into full lateral registration with the opening 38 and the inlet 54 fully out of registration with the opening 40, whereupon only hot water will issue from the nozzle 16, or inlet 52 may be fully or partially moved into lateral registration with opening 40 to provide for either a cold water flow from nozzle 16 or a mixture of any desired temperature between the hot and cold extremes.

The valve provides for a high efficiency of mixing of the hot and cold water inlet streams. As these streams pass through the inlets 52 and 54 they come together for an initial mixing within the element 44. The mixed stream is then divided to pass out of the outlets 56 and 58 and into the passageways 28, and then a second mixing action takes place as the streams issuing from the outlets 32 of passageways 28 come together below the element 44. The mixture then issuing from nozzle 16 is substantially homogeneous as to temperature.

It is to be noted that the greater arcuate length of the outlets 56 and 58 in comparison with the arcuate length of the inlets 52 and 54 ensures that the areal registration of the outlets of element 44 with the inlets of passages 28 is greater in all positions of use of the valve than the areal registration of the inlets with the openings 38 and 40, thus preventing the building up of any back pressure in the valve during operation thereof.

The valve structure lends itself readily to a disassembling operation for purposes of inspection or replacement of parts. Removal of the bolts 80, followed by removal of the cap member 76, lateral withdrawal of the handle 90 from engagement with the slot 62, removal of the ring member 78, and unscrewing of the cap plug 72 from the counterbore 66, makes it possible for the stem 60 to be lifted to withdraw the valve element 44 from the bore 12.

While the preferred embodiment of the invention has been shown and described, it is understood that the valve structure shown is subject to modification within the spirit of the invention and the scope of the appended claim.

What I claim as new and desire to secure by Letters Patent is:

A mixing valve comprising a valve body having an axial bore and oppositely disposed hot and cold fluid inlet passages communicating therewith, a movable member in said bore comprising a rotatable and slidable hollowed cylinder having upper and lower closed ends, said lower end being engageable with a seat in said bore, oppositely disposed by-pass passageways in said valve body having inlet openings communicating with said bore between said inlet passages and said seat and having outlet openings communicating with said bore between said inlet openings and said seat, said inlet and outlet openings of the by-pass passageways and said inlet passages being fully closed by the wall of said cylinder when the latter is in engagement with said seat, a pair of radially spaced inlet apertures and a pair of radially spaced outlet apertures in said cylinder, said inlet apertures being simultaneously brought to communication level with said inlet passages and said outlet apertures being simultaneously brought to communication level with the inlet openings of the by-pass passageways upon axial movement of said cylinder out of engagement with the seat to disclose the outlet openings of the by-pass passageways, said inlet apertures being so dimensioned and radially spaced in relation to the locations and dimensions of the inlet passages that full vertical alignment of one aperture with its passage causes full vertical misalignment of the other aperture with its passage, and partial vertical alignment of one aperture with its passage causes a complementary partial vertical alignment of the other aperture with its passage, said outlet apertures being so dimensioned and radially spaced in relation to the locations and dimensions of the inlet openings of the by-pass passageways that at any given fluid flow position of the cylinder the total areal communication between the said outlet apertures and said inlet openings and between the outlet openings of said by-pass passageways and said bore will be at least as great as the total areal communication between said inlet apertures and said inlet passages, and handle means connected to said cylinder to vertically slide and rotate said cylinder within said bore.

JOHN M. SHRYOCK.

REFERENCES CITED

The following references are of record in the file of this patent:

UNITED STATES PATENTS

| Number | Name | Date |
|---|---|---|
| 804,913 | Allan | Nov. 21, 1905 |
| 1,511,080 | Johnson | Oct. 7, 1924 |
| 1,943,865 | Hennessey | Jan. 16, 1934 |
| 1,945,645 | Kumpman | Feb. 6, 1934 |
| 2,025,440 | Carmody | Dec. 24, 1935 |
| 2,416,582 | Harr | Feb. 25, 1947 |